(12) United States Patent
Sudarshan et al.

(10) Patent No.: US 8,820,309 B2
(45) Date of Patent: Sep. 2, 2014

(54) METHODS, WIRES, AND APPARATUS FOR SLICING HARD MATERIALS

(71) Applicant: University of South Carolina, Columbia, SC (US)

(72) Inventors: Tangali Sudarshan, Columbia, SC (US); Igor Agafonov, Columbia, SC (US); Robert Kennedy, Columbia, SC (US)

(73) Assignee: Univeristy of South Carolina, Columbia, SC (US)

( * ) Notice: Subject to any disclaimer, the term of this patent is extended or adjusted under 35 U.S.C. 154(b) by 0 days.

(21) Appl. No.: 13/622,572

(22) Filed: Sep. 19, 2012

(65) Prior Publication Data
US 2013/0092143 A1    Apr. 18, 2013

Related U.S. Application Data

(63) Continuation of application No. 12/205,046, filed on Sep. 5, 2008, now Pat. No. 8,291,895.

(60) Provisional application No. 60/967,560, filed on Sep. 5, 2007.

(51) Int. Cl.
*B28D 1/06*    (2006.01)

(52) U.S. Cl.
USPC ............................................. 125/21; 125/16.02

(58) Field of Classification Search
USPC .................... 125/21, 16.02; 51/293, 307, 309
See application file for complete search history.

(56) References Cited

U.S. PATENT DOCUMENTS

| | | | | |
|---|---|---|---|---|
| 5,564,409 | A | * | 10/1996 | Bonzo et al. ..................... 125/12 |
| 6,065,462 | A | * | 5/2000 | Hodsden et al. ................. 125/21 |
| 6,295,977 | B1 | * | 10/2001 | Ripper et al. ............. 125/16.02 |
| 6,543,434 | B2 | * | 4/2003 | Holzmuller et al. ............ 125/21 |

* cited by examiner

*Primary Examiner* — Robert Rose
(74) *Attorney, Agent, or Firm* — Bingham McCutchen LLP

(57) ABSTRACT

Methods, wires, and apparatus for use in cutting (e.g., slicing) hard, brittle materials is provided. The wire can be a super-abrasive wire that includes a wire core and super-abrasive particles bonded to the wire core via a metal bonding layer. This wire, or another type of wire, can be used to slice workpieces useful for producing wafers. The workpieces can be aligned within a holder to produce wafers using the device and methods presently provided. The holder rotates about its central axis, which translates to workpieces moving in orbit around this axis. A single abrasive wire, or multiple turns of wire stretched tightly between wire guides, is then contacted with the rotating holder to slice the workpieces.

24 Claims, 5 Drawing Sheets

METHODS, WIRES, AND APPARATUS FOR SLICING HARD MATERIALS

PRIORITY INFORMATION

The present application is a continuation of U.S. patent application Ser. No. 12/205,046, filed on Sep. 5, 2008, which claims priority to U.S. Provisional Patent Application Ser. No. 60/967,560 filed on Sep. 5, 2007, the entire disclosure of each of which is incorporated by reference herein.

GOVERNMENT CLAUSE

The present invention was developed with funding from the Office of Naval Research under Grant N00014-01-0282. Therefore, the government retains certain rights in this invention.

BACKGROUND OF THE INVENTION

The wafering process is necessary in the semiconductor industry because semiconductor devices are fabricated on flat surfaces. Bulk semiconductor material such as Si, SiC, and GaAs are grown as long cylindrical crystals. In order to minimize device size and maximize the surface area available for device fabrication, these cylindrical ingots must be sliced into thin wafers.

Several techniques have been employed to slice semiconductor ingots into wafers. Rotary ID saws are common for softer materials. ID saws use an abrasive impregnated disc to slice one wafer at a time from large ingots. However, kerf loss and cutting efficiency of ID saws are not suitable for extremely hard materials such as SiC. Therefore, wire based slicing is prevalent in hard materials.

A common technique in these applications is slurry based wire slicing. Steel wire is used to carry abrasive particles suspended in slurry to the cutting surface. This technique is often quite slow. Also, the efficiency of the consumable abrasive slurry is low resulting in high cost of operation.

Another popular technique uses abrasive impregnated wire. This technique is often faster and the waste of abrasive particles is minimized as they are bonded to the wire. However, the surface quality of the produced wafers is poor. Saw marks are formed and must be lapped away.

Other slicing techniques use a multi-stage slicing process. First, the ingot is rotated and sliced until the wafers are held together by only a small central section at the axis of rotation. Then rotation stops and the center section is cut away conventionally. This results in very high quality surfaces with the exception of a protruding deformity in the center of each wafer. This deformity must be lapped away.

Previously, composite metal wire with vapor deposited SiC and a boron coating was developed, such as the abrasive wire disclosed in U.S. Pat. No. 4,139,659. The wire developed under this patent offered improvements over the preceding art. However, for cutting extremely hard, brittle materials, such as a silicon carbide or sapphire, wire fixed with a so-called super-abrasive such as diamond, is required.

Additionally, electrodeposition wire comprising abrasives attached to a wire core wire have been developed. Such an abrasive wire is disclosed in "Development of Spiral Chip-Pocket Wire Tool Electrodeposited Diamond Grains", Journal of the Japan Society for Precision Engineering, 62(2):242, 1996. However, the manufacturing cost of the electrodeposition abrasive wire is high since it takes a long time to bond the abrasives by electrodeposition. Further, the abrasive wire cannot be made long enough for large multi-wire cutting machines, which require lengths of more than 50 km.

Abrasive wire using a resin as the bonding material has also been developed. Such a resin bonded abrasive wire and manufacturing method is disclosed in U.S. Pat. Nos. 6,070,570 and 6,463,921. However, the resin bonded abrasive wire does not produce satisfactory results with respect to the abrasion resistance, mechanical strength, heat resistance, and cutting ability.

As such, a need currently exists for an improved abrasive wire and method of its use for cutting hard brittle surfaces. A need also exists for a slicing technique that will optimize as-cut surface quality and increase slicing efficiency.

SUMMARY OF THE INVENTION

Objects and advantages of the invention will be set forth in part in the following description, or may be obvious from the description, or may be learned through practice of the invention.

The present disclosure is generally directed toward, in one embodiment, a composite super-abrasive wire configured to cut hard materials. The composite super-abrasive wire includes super-abrasive particles (e.g., diamond particles) provided around 5a wire core. A metal bonding layer includes a soldering alloy and a powdered flux material to bond the super-abrasive particles to the wire core.

The composite super-abrasive wire can be formed by coating a metal wire with a liquid flux to create a wet, solderable surface around the metal wire. An abrasive powder mixture, including super-abrasive particles, a powdered soldering alloy, and a powdered flux, can then be applied to the wet, solderable surface. The metal wire can then be heated to fuse the abrasive powder mixture to the metal wire to form the composite super-abrasive wire.

An apparatus for slicing workpieces into wafers is also generally provided. The apparatus includes an abrasive wire (such as the composite super-abrasive wire discussed above) passing around a pair of primary wire guides to create a cutting wire zone having movement of the wire in a first direction. A holder configured to hold at least two workpieces is attached to a spindle such that the holder rotates about a center axis creating a tangential direction of movement of the holder. The abrasive wire and the holder are positioned such that the holder and the abrasive wire can be contacted to slice the workpieces and the first direction of the movement of the wire within the cutting wire zone is opposite to the tangential direction of movement of the holder.

A method of slicing a workpiece to create wafers is also generally provided. According to this method, a workpiece (or more than one workpiece) can be encased within a holder. The holder is rotated to create a tangential movement of the holder about a center axis. Then, the rotating holder is contacted with an abrasive wire moving in a direction substantially opposite to the tangential movement of the holder. The abrasive wire can be moved toward the center axis of the rotating holder as the abrasive wire cuts deeper into the holder to cut through entire workpiece.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

FIG. 6A shows data from a conventionally sliced SiC wafer after the lapping process has been completed, with an average roughness of 190 nm. FIG. 6B shows data from an as-cut SiC wafer sliced using the device shown and described with reference to FIG. 3 according to the present invention, with an average roughness of 130 nm.

Figure 1A:
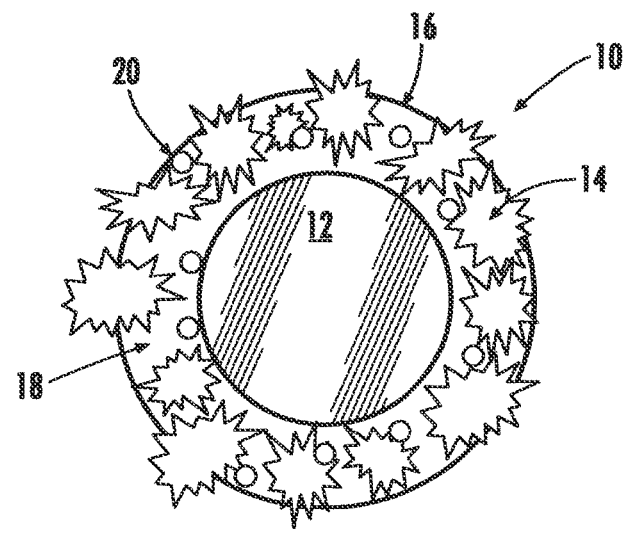
FIGS. 1A and 1B show schematic cross-sectional views illustrating composite super-abrasive wires according to various embodiments of the present invention.

Repeat use of reference characters in the present specification and drawings is intended to represent the same or analogous features or elements of the present invention.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

In general, the present disclosure is directed to methods, wires, and apparatus for use in cutting (e.g., slicing) hard, brittle materials including but not limited to silicon ingot, silicon carbide, sapphire, crystal, quartz, metals, and other wafer materials.

I. Composite Super-Abrasive Wire

A composite super-abrasive wire configured to cut hard materials is generally disclosed. The composite super-abrasive wire can provide an efficient cutting operation and can have a long service life. Additionally, the composite super-abrasive wire can have superior cutting ability and high abrasion resistance and can be manufactured in atmosphere in a short period of time and at a low cost.

Referring to FIG. 1A, an exemplary composite super-abrasive wire 10 is shown including a wire core 12 and super-abrasive particles 14 bonded to the wire core 12 via a metal bonding layer 16. As shown, the super-abrasive particles 14 can protrude at least partially above the external surface of the metal bonding layer 16.

The wire core 12 of the composite super-abrasive wire 10 can include a metal wire (e.g., piano wire, guitar wire, stainless steel wire, etc.). In one embodiment, the metal wire utilized as the wire core of the composite super-abrasive wire of the present invention can be solderable. As such, the metal wire can facilitate the bonding of the super-abrasive particles to its surface. Alternatively, the wire core 12 can include a non-solderable wire having a solderable outer coating about the wire (e.g., bronze coated piano wire) that can facilitate soldering of the wire to the super-abrasive particles. For example, the outer coating can be a solderable metal coating (e.g., tin, copper, lead, indium, silver, bismuth, etc., and mixtures thereof).

The size of the wire core 12 can vary with the desired application of the resulting composite super-abrasive wire 10. For example, in applications involving the production of wafers by slicing ingot materials, the wire core 12 of the composite super-abrasive wire 10 can have a diameter of less than about 1000 microns, such as less than about 750 microns. In one embodiment, the wire core 12 of the composite super-abrasive wire 10 can have a diameter of from about 10 microns to about 500 microns, such as from about 150 microns to about 300 microns.

The super-abrasive particles 14 are provided around the wire core 12 to create an abrasive cutting surface configured to cut through extremely hard materials. The super-abrasive particles 14 have a higher than the hardness of the material to be cut. In most applications, the hardness of the super-abrasive particles 14 can be at least about 8 on the Mohs scale of mineral hardness, such as at least about 9. In one embodiment, the super-abrasive particles 14 can have a hardness of about 10 on the Mohs scale of mineral hardness. For example, the super-abrasive particles 14 can be diamond particles, boron nitride particles, alumina, silicon carbine particles, or mixtures thereof. Diamond particles are particularly preferred super-abrasive particles 14 due to superior cutting ability and hardness when compared to other particles.

Figure 1B:
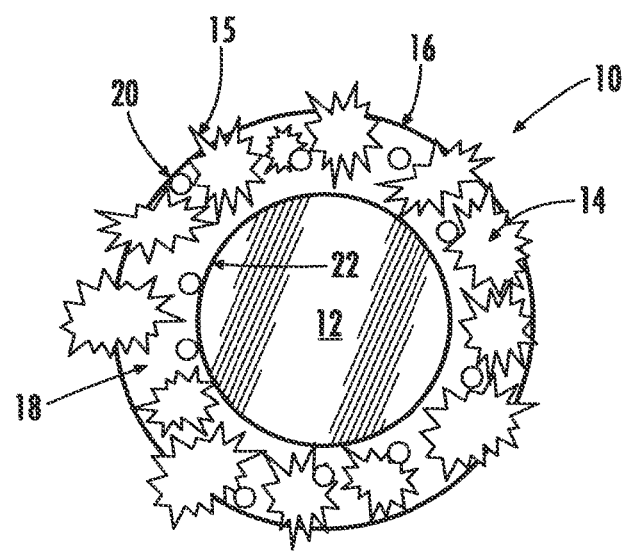

In one embodiment, the super-abrasive particles 14 can be metal plated to provide a solderable surface to the super-abrasive particles 14. FIG. 1B shows a composite super-abrasive wire 10 having super-abrasive particles 14 with metal plates 15 on the outer surface of the super-abrasive particles 114. Without wishing to be bound by theory, the presence of the metal plate 15 on the super-abrasive particles 14 is believed to enhance the bond strength of the super-abrasive particles 14 to the wire core 12 via the metal bonding layer 16 upon soldering. For instance, the super-abrasive particles 14 can be plated with a solderable metal material, such as tin, copper, lead, indium, silver, bismuth, etc., and mixtures thereof.

The super-abrasive particles 14 are securely bonded to the wire core 12 via the metal bonding layer 16. The metal bonding layer 16 includes a solder alloy 18 and a flux material 20. Both the solder alloy 18 and the flux material 20 can be, in one particular embodiment, applied to the wire core 12 as a powder mixed with the super-abrasive particles 14, as discussed below. The solder alloy 18 can include any solderable material or mixture. Suitable solder alloys include but are not limited to tin, copper, lead, silver, bismuth, and mixtures thereof. In one embodiment, the solder alloy 18 can be substantially lead-free. Suitable solder alloys are available commercially from Amtech, Inc. (Branford, Conn.), such as the solder alloy mixtures listed in Table I (each solder alloy is shown having its percentage by weight the solderable metal components):

TABLE 1

| Solder Alloy (wt. %) | Liquidis (° C.) | Solidis (° C.) |
|---|---|---|
| Sn (42), Bi (58) | 138 | 138 |
| Sn (43), Pb (43), Bi (14) | 163 | 144 |
| Sn (62), Pb (36), Ag (2) | 179 | 179 |
| Sn (63), Pb (37) | 183 | 183 |
| Sn (60), Pb (40) | 191 | 183 |
| Sn (95.5), Ag (4), Cu (0.5) | 217 | 219 |
| Sn (95.8), Ag (3.5), Cu (0.7) | 217 | 217 |
| Sn (96.5), Ag (3.5) | 221 | 221 |
| Sn (99.3), Cu (0.7) | 227 | 227 |
| Sn (95), Sb (5) | 240 | 235 |
| Sn (95), Ag (5) | 245 | 221 |
| Sn (5), Pb (92.5), Ag (2.5) | 284 | 280 |
| Sn (10), Pb (88), Ag (2) | 290 | 268 |
| Sn (10), Pb (90) | 302 | 268 |
| Sn (5), Pb (95) | 312 | 308 |

One particularly preferred solder alloy is tin and silver mixture having about 96.5% tin and about 3.5% silver, by weight.

The flux material 20 of the metal bonding layer 16 inhibits oxidation of the wire core 12, the solder alloy 18, and any filter materials present. Flux is a substance which is nearly inert at room temperature, but which becomes strongly reducing at elevated temperatures, preventing the formation of metal oxides. Additionally, flux can allow solder to flow easily on the working piece rather than forming beads as it would otherwise. Common fluxes include but are not limited to ammonium chloride or rosin for soldering tin; hydrochloric acid and zinc chloride for soldering galvanized iron (and other zinc surfaces); and borax for brazing or braze-welding ferrous metals.

A number of Standards exist to define the various flux types. The principal standard is J-STD-004. J-STD-004 characterises the flux by type (e.g. Rosin (RO), Resin (RE), Organic (OR), Inorganic (IN)), its activity (strength of fluxing) and reliability of residue from a surface insulation resistance (SIR) and electromigration standpoint, and whether or not it contains halide activators.

In one embodiment, the flux material 20 can include a rosin. Rosin is a form of resin obtained from pines and some other plants, mostly conifers, produced by heating fresh liquid resin to vaporize the volatile liquid terpene components. Rosin is the resinous constituent of the oleo-resin exuded by various species of pine, known in commerce as crude turpentine, Rosin varies in color, according to the age of the tree from which the turpentine is drawn and the degree of heat applied in distillation, from an opaque, almost pitch-black substance through grades of brown and yellow to an almost perfectly transparent colorless glassy mass. The commercial grades are numerous, ranging by letters from A, the darkest, to N, extra pale, superior to which are W, window glass, and WW, water white varieties, the latter having about three times the value of the common qualities.

Of course, other materials can be optionally present in the metal bonding layer 16. For example, filler material can be included within the metal bonding layer 16. The metal bonding layer 16 can be, however, substantially free of other functional materials. For example, photoinitiators, crosslinking agents, and other materials required for bonding a polymeric resin are not required and can be omitted from the metal bonding layer 16 of the present disclosure.

Upon heating, the metal bonding layer 16 (i.e., the solder alloy 18 and the flux material 20) fuses the super-abrasive particles 14 to the wire core 12 forming the composite super-abrasive wire 10.

Figure 2:
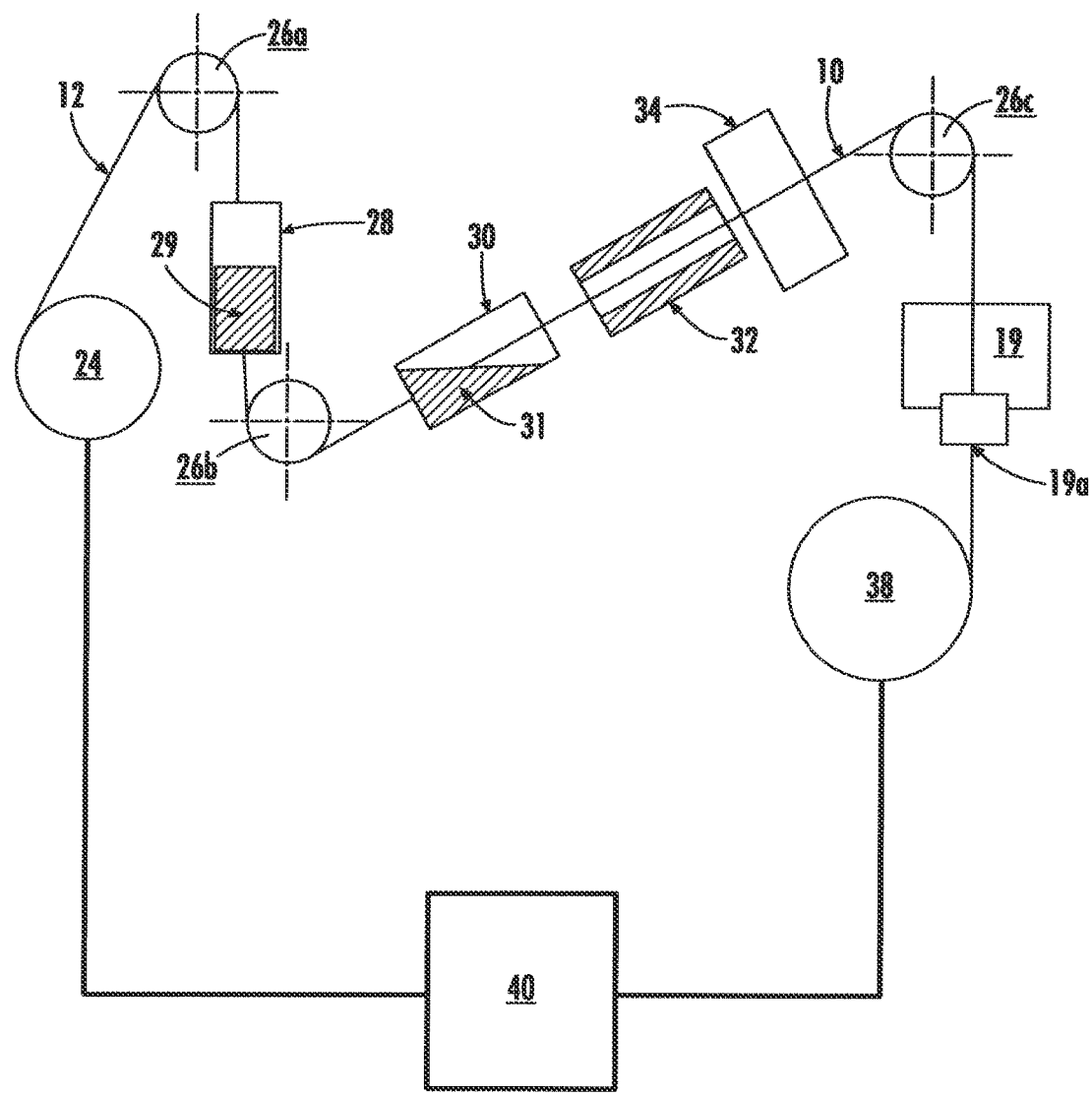
FIG. 2 shows a schematic of an exemplary manufacturing apparatus for producing a composite super-abrasive wire according to the present invention.

FIG. 2 depicts an exemplary method for forming the composite super-abrasive wire 10. According to this exemplary method, the wire core 12 is unwound from the take-off spool 24 and passed through a liquid flux chamber 26 containing a liquid flux 28. For example, the wire core 12 can be etched to clean the outer surface and/or coated with a liquid flux to enhance the bonding of the super-abrasive particles 14 to the wire core 12. Due to its relatively sticky nature, the liquid flux can act as a temporary adhesive that adheres the super-abrasive particles 14 and metal bonding layer 16 to the wire core 12 prior to and during the soldering process.

Liquid flux can help the metal bonding layer 16 to "cling" to the wire core 12 by removing oxide buildup from the surface of the wire core 12, otherwise oxidation on the wire core surface can inhibit solder from bonding to it. Flux can help spread heat out to ensure uniform heating and inhibit additional oxidation from occurring during the application of heat.

Although only a single liquid flux chamber 26 is shown, the wire core 12 can be passed through more than one liquid flux chamber 26 to apply more than one liquid flux to the outer surface of the wire core 12 prior to the application of the super-abrasive particles 14 and metal bonding layer 16. For example, a harsher liquid flux an aggressive liquid flux containing a strong acid such as the liquid flux sold under the designation N-3 by LA-CO Industries, Inc. Elk Grove, Ill., believed to be a mixture of zinc chloride, hydrochloric acid, and ammonium chloride with a pH of about 4) can be first applied to etch the surface of the wire core 12, followed by a milder liquid flux (such as the water soluble paste flux sold under the designation H-20$^5$ by Oatey Co., Cleveland, Ohio, which is believed to be a mixture of triethanolamine hydrochloride, zinc chloride, and ammonium chloride with a pH of 3-4) configured to help adhere the super-abrasive particles 14 and metal bonding layer 16 to the wire core 12. The harsher liquid flux can effectively etch or otherwise clean the surface of the wire core 12 for soldering.

In one embodiment, the liquid flux includes an acid (e.g., pH of between 1 and 6) to remove oxide from the metal wire surface, with the general formula being:

Metal oxide+Acid→Salt+Water

Then, the wire core 12 is coated with an abrasive powder mixture 31 by passing the wet wire core 12 (coated with the liquid flux 28) through the matrix powder chamber 30. The abrasive powder mixture 31 contains the super-abrasive particles, the powdered solder alloy, and the powdered flux. In one embodiment, the ratio of components of the abrasive powder mixture 31 can be about 1 weight part diamonds to about 2.5 weight parts powdered solder alloy to about 0.3 weight part powdered flux. However, the relative quantities of these components can vary according to the desired abrasiveness of the resulting composite super-abrasive wire to be formed. The powdered solder alloy and the powdered flux eventually fuse together to form the metal bonding layer 16.

The wire core 12 is then heated to fuse the metal bonding layer 16 and the super-abrasive particles 14 to the wire core 12. As shown, a tunnel, furnace 32 (such as tube resistor "Clarostat," 200 watt, 10 ohm, T=300° C.) can be used to fuse the abrasive powder mixture 31 to the wire core 12. However, heating can be accomplished through the use of any heat source. In one embodiment, a furnace or oven can heat the wire to fuse the metal bonding layer and the super-abrasive particles 14 to the wire core 12. The amount of heat required to fuse the metal bonding layer to the wire core can vary depending on the type of solder, flux, and wire core materials selected, but will generally range from about 100° C. to about 450° C., such as from about 250° C. to about 350° C. The temperature should be higher than the melting point of the solder alloy but lower than the minimum temperature of the wire core wire tempering. The heating time for fusing the metal bonding layer to the wire core can be as short as a second or two. For example, the matrix and the wire core can be heated for up to about 5 seconds, such as from about 1 second to about a minute. However, the coated wire core can be heated for any period of time to fuse the metal bonding layer to the wire core, and may vary according to the type of solder, flux, and wire.

After heating, the resulting composite super-abrasive wire 10 can be cooled, such as using the water cooler 34, which can be a simple water bath at room temperature.

Finally, the composite super-abrasive wire 10 can be passed through a diameter control system 19. The diameter control system 19 is configured to provide a consistent wire diameter and perform the first cleaning of the wire core 12. The diameter control system 19 contains a rotatable wire die holder 19a (such as a natural diamond model, 0.012 inch diameter hole from Premier Wire Die, Inc., Cumberland, R.I.) which works under the surface of soapy water.

After passing through the diameter control system, the composite superabrasive wire is wound onto the "take on" spool 38. Other washing baths and drying units can be used to further clean the wire core 12, if desired. For example, the wire core 12 can be passed through a bath containing roughly 70% isopropyl alcohol, an ultrasonic bath with soapy water (such as a Cole Parmer long bed bath), and finished with a second isopropyl alcohol bath.

Additionally, the winding speed and tension of the composite superabrasive wire can be controlled by a control unit 40. This unit maintains a constant winding speed by a driven pulley with a deep and small angle (about 15 degrees) v-groove. The wire maintains contact with the bottom of this groove and is pulled in line with a constant speed. At the same time, the take-on spool rotates by a magnetic powder clutch (such as the Model C-130-24 from Placid Industries, Inc) located between the take-on spool holder and the spool motor. A constant tension is maintained with the magnetic powder brake (such as the brake also contained in the Model C-130-24 from Placid Industries, Inc) located between the take-off spool of wire and the frame.

The described composite superabrasive wire apparatus can continuously fabricate the composite abrasive wire at a speed of a few meters per minute since the solder alloy, which solders the diamonds to the wire core wire, crystallizes within seconds.

II. Apparatus for Slicing Hard Materials Using a Composite Super-Abrasive Wire

The present disclosure is also directed to methods and devices for orbital slicing of ingots or other hard brittle materials, such as those materials useful in the production of wafers from hard crystalline or amorphous materials in the semiconductor industry.

According to this embodiment, the use of a super-abrasive wire (such as the composite super-abrasive wire disclosed above) can be used to slice a workpiece (e.g., a silicon ingot) positioned within a rotating holder. The rotation of the holder creates a tangential movement of the workpiece relative to the slicing wire to further improve slicing speed and surface quality than previous slicing techniques. Slicing efficiency can be increased by reducing the time necessary to produce wafers and also by reducing the consumable cost per wafer.

The presently disclosed slicing methods and devices use a simple, single stage process. Also, slicing artifact, such as the central deformities associated with previous slicing devices and methods, are inherently eliminated due to the machine's design. Additionally, the surface after slicing is ready the polishing, eliminating the need for a lapping step. Finally, multiple workpieces can be cut simultaneously using these devices and methods.

The methods and devices for slicing multiple wafers from multiple workpieces can use a super-abrasive wire (such as disclosed above) or metal wire with abrasive slurry to slice the workpieces. One or more workpieces move in an orbital rotation about a common axis of a holder. This unconventional wiresaw machine is capable of producing multiple wafers from multiple workpieces of extremely hard materials using diamond or other abrasive particles impregnated in metal wire or delivered to the cutting surface in the form of slurry. The wiresaw operates at a comparably high rate of speed and results in wafer surface characteristics that are in most cases superior to lapped wafers with respect to average surface roughness, flatness, and total thickness variation.

The superior wafers are possible because multiple workpieces are rotated in an orbital fashion about a common axis. The cutting action is a combination of linear wire motion and the orbital rotation of the holder creating tangential movement of the workpieces relative to the cutting wire(s). As with any type of rotary slicing, surface quality is improved by increasing the differential speed between the wire and workpiece and reducing the contact area between the abrasive wire and the cutting surface. The orbital rotation permits high tangential velocities because the diameter of rotation is not limited to the diameter of the workpiece and the cut depth. The orbital rotation speed can be varied, typically from about 100 to about 5000 RPM. A large diameter holder encloses several workpieces at its perimeter, allowing the cutting velocity, or tangential velocity, to be maintained constant by way of electronic control throughout the entire depth of the cut.

The contact area of the cutting surface may be optimized by controlling the rate at which the wire penetrates the workpieces. A low rate of progression results in very high surface quality wafers and a reduced slicing speed due to low contact area at the cutting surface. A high rate of progression results in reduced surface quality due to increased wire bow. In other slicing machines, wire bow causes "wandering" of wires and inherently high total thickness variation. The device presently disclosed is less sensitive to bow and avoids total thickness variation problems due to bow by dramatically reducing or even eliminating wandering. The ratio of contact area at the cutting surface to lateral contact area remains low at all times, even under high wire bow conditions. Therefore, the wire sees significantly higher impedance to lateral motion than motion into the cutting surface.

Using the presently disclosed devices and methods, slicing may be performed in only one stage. Crystalline workpieces may be aligned within the holder to a specified crystallographic orientation in order to produce custom wafer orientations. The holder rotates about its central axis, which translates to workpieces moving in orbit around this axis. A single abrasive wire, or multiple turns of wire stretched tightly between wire guides, is then contacted with the rotating holder. Average wire speed is typically about 5 mm/s to about 7 mm/s, but can be varied. The wire is then driven into the holder and through the workpieces. The wire is passed through the system from a take-off spool to a take-on spool at opposite sides of the machine at an average rate such that the wire in use is replaced as it becomes worn. This may be done in a continuous fashion or by jogging the wire back and forth such that the average movement results in wire collection at the take-on spool. This process continues until the wire has penetrated through the holder to a depth sufficient to completely cut the workpieces. The wafers are contained by the holder during and after the slicing process and may then be removed from the holder individually. In this manner, the machine is capable of producing high quality wafers of high hardness materials both quickly and reliably. Very small abrasive particles can be used subsequent to slicing to achieve even lower surface roughness of the produced wafers. A flow of liquid coolant can be used to remove heat and waste material from the cutting surface.

Figure 3:
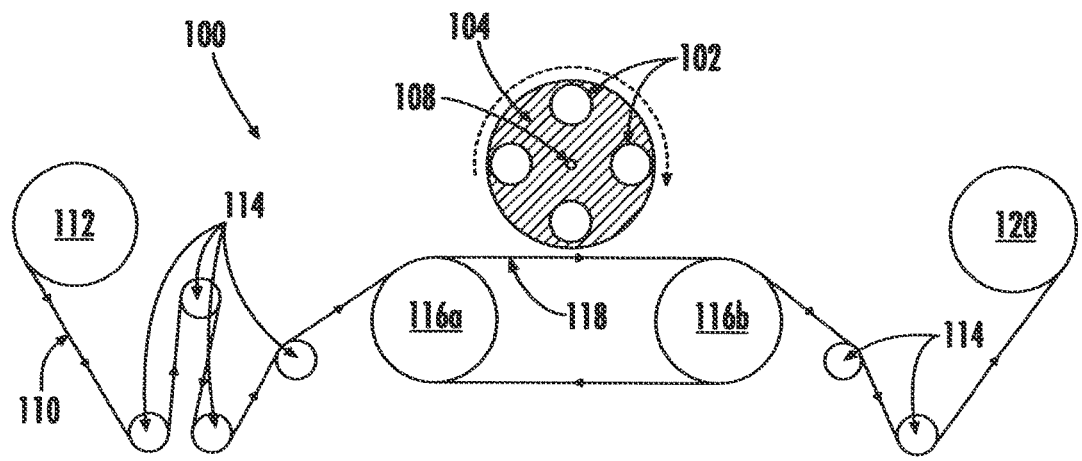
FIG. 3 shows an exemplary system schematically illustrating the abrasive wire movement and workpieces during slicing.
Figure 4:
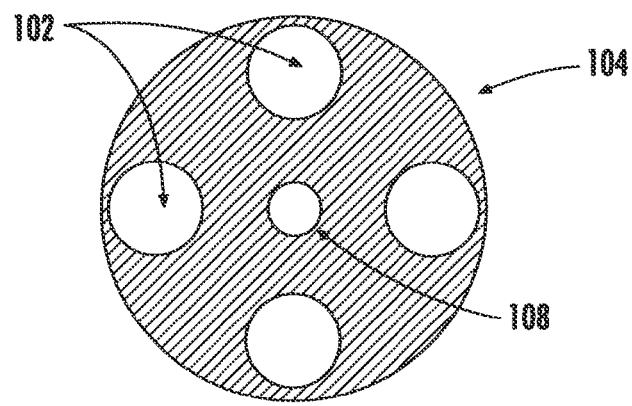
FIG. 4 shows a schematic of an exemplary holder configured to hold four workpieces.

For example, FIG. 3 depicts an exemplary device 100 for single stage slicing according to one particular embodiment of the present invention. The workpieces 102 are secured within a disposable or reusable holder 104, preferably about the perimeter. The workpieces 102 can be any material desired to be sliced, such as SiC single crystals. The workpieces 102 can be ground into a cylindrical shape, if desired, and then cast or installed into the holder 104. An exemplary holder 104 is shown in FIG. 4 having four workpieces 102 posited about its periphery with a spindle connection 108 in the middle of the holder. The holder 104 is configured to rotate about the spindle connection 108 in the middle of the holder 104 about the center axis of the holder. Although shown with four workpieces 102, the holder can be configured for any number of workpieces. However, in most embodiments, it is preferred that the weight be substantially equally distributed about the holder 104 (including the workpieces 102) to allow for smooth rotation about the spindle connection 108.

With reference to the holder 104 of FIG. 4, the holder 104 may be a disposable item cast of a low cost, rigid compound. One such suitable material is castable polyester combined with a milled glass fiber aggregate. The holder 104 may be cast with the workpieces 102 in place, or with voids to be later filled with workpieces 102.

The holder 104 is secured to a rotation spindle for rotation about its center axis. The holder 104 should be rigidly mounted to the spindle such that it is immobile in all directions exempt of axial rotation. The holder 104, in one particular embodiment, is sufficiently balanced to reduce vibration of the holder 104 (and thus the workpieces 102) during rotation. For example, two, three, or four similarly sized and spaced workpieces can be used within a holder to reduce balancing complications.

Figure 5:
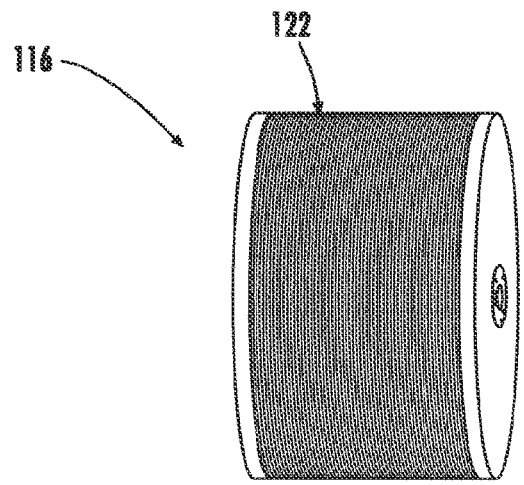
FIG. 5 shows an example of a primary wire guide suitable to support multiple turns of wire.

An abrasive wire 110 (such as the wire shown in FIG. 1A or FIG. 1B) is routed from a take-off, or source, spool 112 through intermediate guide pulleys 114 to the primary wire guides 116a, 116b. The wire 110 is wound around the two primary wire guides 116a, 116b in a spiral fashion for multiple turns. Thus, a plurality of wires 110 are positioned within the cutting zone 118 to contact the holder 104 and workpieces 102. For example, in one embodiment, the primary wire guides 116a, 116b can move horizontally in order to align the cutting wires 118 with workpieces 102 of differing thickness and placement within the holder 104. The multiple wire windings 118 are held parallel to each other and perpendicular to the holder 104 by equidistant grooves 122 machined onto the circumference of the primary wire guides 116, such as shown in FIG. 5. The number of turns, N, around the primary wire guides 116 is relative to the number of wafers to be sliced from each workpiece 102. For example, n number of windings results in n-1 wafers per workpiece 102. Then, the wire 110 passes through more intermediate guide pulleys 114 to a take-on, or removal, spool 120.

While the abrasive wire 110 is in motion, the holder 104 is set into rotation about its central axis. Then, the cutting wires 118 can be contacted with the holder 104 and the workpieces 102 such that the direction of the movement of the cutting wire(s) 118 is opposite from the direction of the tangential movement of the rotating holder 104 and workpieces 102.

For example, the entire spindle holding the holder 104 can be moved into position to contact the cutting wires 118. As shown in FIG. 3 having a vertical arrangement, the holder 104 would be moved down into contact with the wire 110 at the plurality of cutting wires 118. The wire 110 penetrates the holder 104 tangentially to the circumference of the holder 104 and the point of contact progresses toward the axis of rotation (i.e., toward the spindle connection 108) until such a time that the workpieces 102 have been completely separated into wafers.

Alternatively, the cutting wires 118 can be brought into contact with the holder 104 and the workpieces 102 through vertical movement of the primary wire guides 116a, 116b toward the rotating holder 104.

The take-off spool 112 and take-on spool 120 are responsible for wire 110 tension as well as wire 110 motion. Wire 110 may move continuously from the take-off spool 112 to the take-on spool 120. The take-on spool 120 can be coupled to a motor that rotates the spool to collect wire 110. The speed of this motor defines the speed at which wire 110 passes through the system. The wire 110 speed can be preferably set such that wire 110 is collected onto the take-on spool 120 as its effectiveness as an abrasive diminishes. The rate at which this occurs can be determined experimentally, and can vary as a function of the workpiece material hardness, the quantity of wafers to be produced (e.g., the number of wraps of the wire about the primary wire guides), the holder diameter, the holder material hardness, the holder material elasticity, the speed of rotation of the holder, the type of abrasive wire, etc.

Braking torque can be applied to the take-off spool 112 to apply tension to the wire 110. The tension, F, is relative to the brake torque, T, by the relationship $F=(T)/(R)$. This is true when R is the effective radius of the take-off spool 112, torque is in units of Newton-meters, and tension is in units of Newtons. The optimum tension for slicing the workpieces can also vary due to the variables discussed in references to the rate of abrasive diminishment of the wire 110.

Depending on the application, an alternative tension system may be realized by way of coupling motors to both the take-on 120 and take-off 112 spools. Thus, braking torque and rotational motion may be applied to both spools.

Figure 6A:
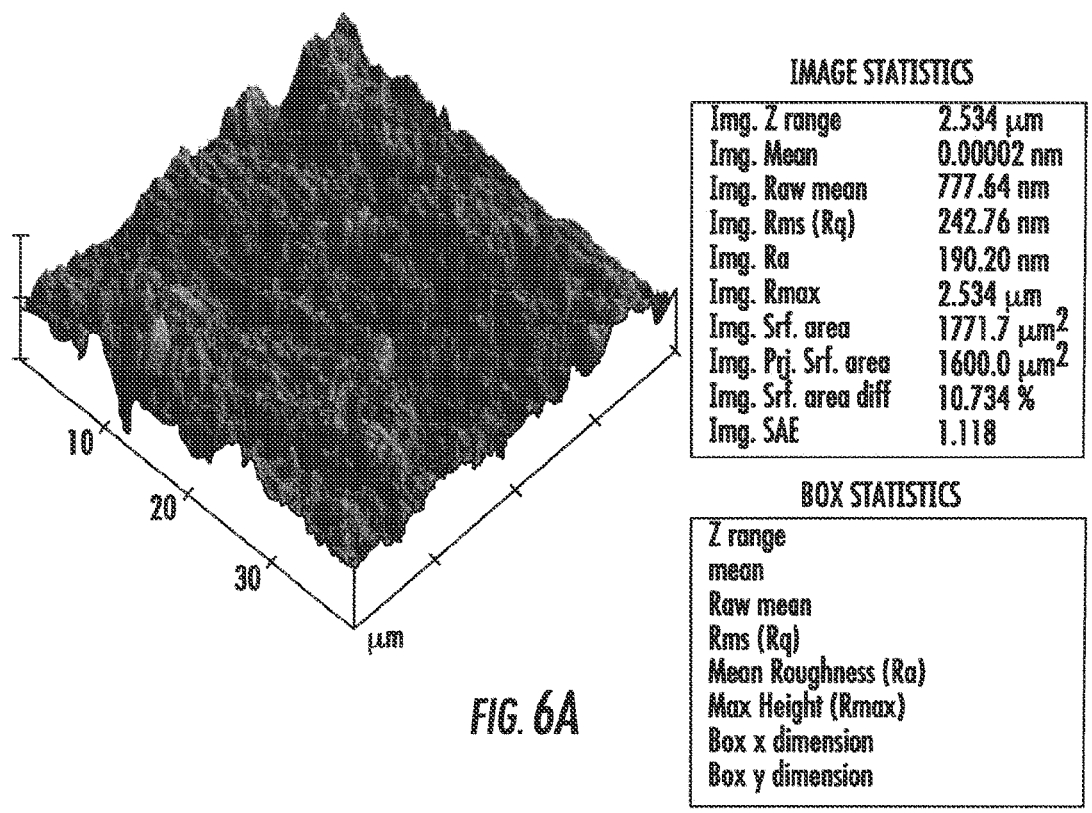
FIGS. 6A and 6B show surface roughness comparison using atomic force microscopy.
Figure 6B:
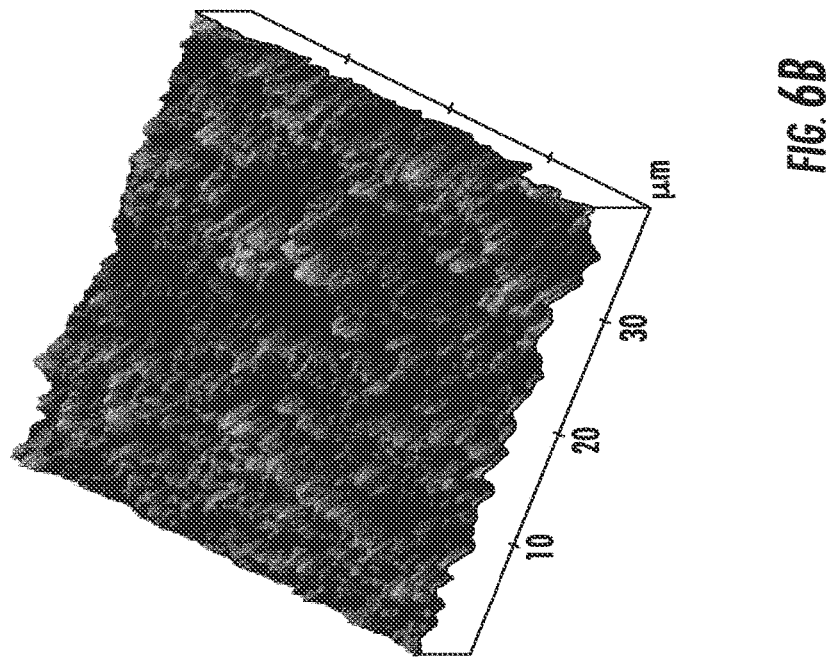

The abrasive wire 110 is set into motion and the holder 104 is made to rotate about the spindle connection 108 such that the tangential velocity vector of the rotating holder 104 is opposite in direction to the direction of wire 110 motion. The windings 118 of abrasive wire 110 that extend between the two primary wire guides 116a, 116b are brought into contact with the cutting surface of the holder 104. The windings 118 continue to progress toward the center of the axis of rotation of the holder 104 and through the workpieces 102 at a rate determined by the removal rate of material from the workpieces 102. This progression continues throughout the slicing process until the abrasive wire 110 penetrates the holder 104 to a depth greater than or equal to the maximum radial depth occupied by the workpieces 102. The resulting wafers remain entrapped in the holder 104 after slicing is complete. The holder 104 is removed from the spindle and cut or broken apart to expose and free the entrapped wafers. FIG. 6B shows the results obtained from such a process. Surface flatness is good, total thickness variation is less than 15 to 20 microns for 500 to 600 micron thick SiC wafers, and the average surface roughness is superior to lapped wafers of similar crystalline quality.

EXAMPLE

Forming a Composite Super-Abrasive Wire

The following is a description of the composite super-abrasive wire formed by an apparatus as shown in FIG. 2:

A wire core metal wire having a diameter of about 230 microns (tin coated or high tensile steel wire) was etched by passing through an etching bath of an acid containing an aggressive liquid flux (N-3 by LA-CO Industries, Inc. Elk Grove, Ill.) maintained at room temperature. As the wire exited the etching bath, it was wound on a "take-off" spool. The etched wire was then introduced into the liquid flux applying chamber so that the wire was covered by the liquid flux (water soluble paste flux sold under the designation H-20$^5$ by Oatey Co., Cleveland, Ohio). The wire was then passed through a powder chamber so that the wire was covered by the mixture, which includes the powdered solder alloy (96.5% tin and about 3.5% silver, mesh −400/+500; Amtech, Inc., Branford, Conn.), the powdered flux material (Rosin Powder, Todd & Moore sports shop, Columbia, S.C.), and solderable superabrasive particles (copper coated diamonds 25-30 microns, RIK-1 cu size GE Micron Products, Inc. Deerfield Beach, Fla.; or copper coated diamonds size 20-30 microns from Mant USA, Inc., Windsor, Conn.) at a ratio of about 1 weight part diamonds to about 2.5 weight parts powdered solder alloy to about 0.3 weight part powdered flux. This mixture adhered to the wire core wire due the wet wire core wire surface created in the first chamber. The size of the superabrasive particles was about 20 to 25 microns.

The wire then passed through the tunnel furnace (such as tube resistor "Clarostat," 200 watt, 10 ohm, T=300° C.) which projected heat onto the powdered mixture that has adhered to the wire core wire. The solder alloy contained in the superabrasive matrix mixture was fused with the flux by the heat produced by the tunnel furnace and, thereby, the metal matrix was formed. The stable temperature inside the tunnel furnace (53V and 3.7 A) was higher than the melting point of the solder alloy (such as AMTECH, Alloy 96.5 Sn/3.5 Ag, mesh-400/+500) but lower than the minimum temperature of the wire core wire tempering. Accordingly, the solderable diamond particles were securely soldered to the solderable wire core wire by the solder alloy metal matrix and, thereby, a composite superabrasive wire, as shown in FIG. 1A or FIG. 1B, was formed.

After the formed composite superabrasive wire exited the tunnel furnace, it passed through room temperature water in the water cooler unit and then through the diameter control system. This system maintained a consistent wire diameter and performs the first cleaning of the wire. The system contained a rotatable wire die holder such as a natural diamond model, 0.012 inch diameter hole from Premier Wire Die) which worked under the surface of soapy water.

After passing through the diameter control system, the composite superabrasive wire was wound onto the "take on" spool via the washing and drying units, which consist of a bath containing roughly 70% isopropyl alcohol, an ultrasonic bath with soapy water (such as a Cole Palmer long bed bath), and finished with a second isopropyl alcohol bath.

The winding speed and tension of the composite superabrasive wire were controlled by a control unit. This unit maintained a constant winding speed by a driven pulley with a deep and small angle (about 15 degrees) v-groove. The wire maintained contact with the bottom of this groove and was pulled in line with a constant speed. At the same time, the take-on spool rotated by a magnetic powder clutch (such as the Model C-130-24 from Placid Industries, Inc) located between the take-on spool holder and the spool motor. A constant tension was maintained with the magnetic powder brake (such as the brake also contained in the Model C-130-24 from Placid Industries, Inc) located between the take-off spool of wire and the frame.

An abrasive wire with a diameter approximately 0.26 mm to 0.27 mm thicker than the diameter of the wire core was obtained.

These and other modifications and variations to the present invention may be practiced b those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. An apparatus for slicing workpieces into wafers, the apparatus comprising:
    an abrasive wire passing around a pair of primary wire guides to create a cutting wire zone having movement of the abrasive wire in a first direction; and
    a rotatable holder configured to (i) hold at least two workpieces, and (ii) contact the cutting wire zone, wherein rotation of the holder about a center axis creates a tangential direction of movement of the holder opposite to the first direction.

2. The apparatus of claim 1, wherein the cutting wire zone comprises a plurality of cutting segments formed by winding the abrasive wire about primary wire guides at least once.

3. The apparatus of claim 1, wherein the holder is configured to hold the at least two workpieces such that the center axis of the holder is spaced apart from a center axis of each of the workpieces.

4. The apparatus of claim 1, wherein the abrasive wire comprises:
    a wire core;
    super-abrasive particles disposed around the wire core, the super-abrasive particles (i) being plated with a solderable metal material comprising at least one of tin, copper, lead, indium, silver, or bismuth, or (ii) consisting essentially of unplated diamond, boron nitride, alumina, silicon carbide, or a mixture thereof; and
    a metal bonding layer bonding the super-abrasive particles around the wire core, the metal bonding layer comprising a soldering alloy.

5. The apparatus of claim 1, wherein the abrasive wire comprises:
    a wire core;
    super-abrasive particles disposed around the wire core; and
    a metal bonding layer bonding the super-abrasive particles around the wire core, the metal bonding layer comprising a soldering alloy,
    wherein (i) at least some of the super-abrasive particles are disposed in contact with the wire core and (ii) portions of the metal bonding layer are disposed between at least some others of the super-abrasive particles and the wire core such that the at least some other super-abrasive particles are not in contact with the wire core.

6. A method of slicing a workpiece to create wafers, the method comprising:
    encasing a workpiece in a holder;
    rotating the holder to create a tangential movement of the holder about a center axis;

contacting the rotating holder with an abrasive wire, wherein the abrasive wire is moving in a direction substantially opposite to the tangential movement of the holder; and moving the abrasive wire toward the center axis of the rotating holder as the abrasive wire cuts deeper into the holder and the workpiece, wherein the center axis of the holder is spaced apart from a center axis of the workpiece.

7. The method of claim 6, wherein a plurality of wire sections are simultaneously contacted with the rotating holder.

8. The method of claim 7, wherein the plurality of wire sections are formed by winding the abrasive wire about at least two primary wire guides.

9. The method of claim 6, wherein the rotating holder is contacted with the abrasive wire by moving the rotating holder toward the abrasive wire.

10. The method of claim 6, wherein the rotating holder is contacted with the abrasive wire by moving the abrasive wire toward the rotating holder.

11. The method of claim 6, wherein the abrasive wire comprises:
a wire core;
super-abrasive particles disposed around the wire core, the super-abrasive particles (i) being plated with a solderable metal material comprising at least one of tin, copper, lead, indium, silver, or bismuth, or (ii) consisting essentially of unplated diamond, boron nitride, alumina, silicon carbide, or a mixture thereof; and
a metal bonding layer bonding the super-abrasive particles around the wire core, the metal bonding layer comprising a soldering alloy.

12. The method of claim 6, wherein the abrasive wire comprises:
a wire core;
super-abrasive particles disposed around the wire core; and
a metal bonding layer bonding the super-abrasive particles around the wire core, the metal bonding layer comprising a soldering alloy,
wherein (i) at least some of the super-abrasive particles are disposed in contact with the wire core and (ii) portions of the metal bonding layer are disposed between at least some others of the super-abrasive particles and the wire core such that the at least some other super-abrasive particles are not in contact with the wire core.

13. The method of claim 6, further comprising, prior to contacting the rotating holder with the abrasive wire, encasing a second workpiece in the holder, a center axis of the second workpiece being spaced apart from the center axis of the workpiece.

14. The method of claim 13, wherein the center axis of the second workpiece is spaced apart from the center axis of the holder.

15. The method of claim 6, wherein the abrasive wire comprises:
a wire core;
super-abrasive particles disposed around the wire core;
disposed on substantially an entire outer surface of each super-abrasive particle, a metal plate consisting essentially of at least one of tin, copper, lead, indium, silver, or bismuth; and
a metal bonding layer bonding the metal plates of the super-abrasive particles around the wire core, wherein the metal bonding layer comprises a soldering alloy.

16. The method of claim 15, wherein the metal bonding layer additionally comprises a flux material.

17. The method of claim 16, wherein the flux material comprises at least one of ammonium chloride, rosin, hydrochloric acid, zinc chloride, or borax.

18. The method of claim 15, wherein the soldering alloy consists essentially of tin, lead, indium, silver, bismuth, or a mixture thereof.

19. The method of claim 15, wherein each metal plate consists essentially of tin, lead, indium, silver, bismuth, or a mixture thereof.

20. The apparatus of claim 1, wherein the abrasive wire comprises:
a wire core;
super-abrasive particles disposed around the wire core;
disposed on substantially an entire outer surface of each super-abrasive particle, a metal plate consisting essentially of at least one of tin, copper, lead, indium, silver, or bismuth; and
a metal bonding layer bonding the metal plates of the super-abrasive particles around the wire core, wherein the metal bonding layer comprises a soldering alloy.

21. The apparatus of claim 20, wherein the metal bonding layer additionally comprises a flux material.

22. The apparatus of claim 21, wherein the flux material comprises at least one of ammonium chloride, rosin, hydrochloric acid, zinc chloride, or borax.

23. The apparatus of claim 20, wherein the soldering alloy consists essentially of tin, lead, indium, silver, bismuth, or a mixture thereof.

24. The apparatus of claim 20, wherein each metal plate consists essentially of tin, lead, indium, silver, bismuth, or a mixture thereof.

* * * * *